United States Patent [19]
Ottesen et al.

[11] Patent Number: 5,787,292
[45] Date of Patent: Jul. 28, 1998

[54] POWER SAVING METHOD AND APPARATUS FOR USE IN MULTIPLE FREQUENCY ZONE DRIVES

[75] Inventors: Hal Hijalmar Ottesen; Gordon J. Smith, both of Rochester, Minn.

[73] Assignee: International Business Machines Corporation, Armonk, N.Y.

[21] Appl. No.: 625,334

[22] Filed: Apr. 1, 1996

[51] Int. Cl.⁶ .................................................. G06F 11/00
[52] U.S. Cl. .................... 395/750.01; 395/441; 395/488; 395/470; 360/75.01; 360/71
[58] Field of Search ........................... 395/750, 441, 395/488, 182.03, 470, 851; 360/73.03, 71, 31, 75, 48; 369/75.1, 32; 318/66

[56] References Cited

U.S. PATENT DOCUMENTS

| | | | |
|---|---|---|---|
| 4,357,635 | 11/1982 | Hasegawa | 360/51 |
| 4,514,771 | 4/1985 | Stark et al. | 360/73 |
| 4,864,428 | 9/1989 | Kanamaru | |
| 5,087,992 | 2/1992 | Dahandeh et al. | 360/31 |
| 5,111,345 | 5/1992 | Muller | 360/48 |
| 5,235,473 | 8/1993 | Sato et al. | |
| 5,345,347 | 9/1994 | Hopkins et al. | 360/71 |
| 5,355,502 | 10/1994 | Schowe et al. | 395/750 |
| 5,408,369 | 4/1995 | Miura et al. | 360/75 |
| 5,463,758 | 10/1995 | Ottesen | 395/441 |
| 5,471,353 | 11/1995 | Codilian et al. | 360/73.03 |
| 5,493,670 | 2/1996 | Douglis et al. | 395/750 |

FOREIGN PATENT DOCUMENTS

| | | |
|---|---|---|
| 0011495 | 5/1980 | European Pat. Off. . |
| 0383528 | 8/1990 | European Pat. Off. . |
| 0464482A2 | 1/1992 | European Pat. Off. . |
| 0509785A2 | 10/1992 | European Pat. Off. . |
| 0660324 | 6/1995 | European Pat. Off. . |
| 2312833 | 12/1976 | France . |
| 4011597A1 | 10/1990 | Germany . |
| 4121698C1 | 12/1992 | Germany . |
| 60-171672 | 2/1984 | Japan . |
| 2231707 | 11/1990 | United Kingdom . |
| WO 92/22063 | 12/1992 | WIPO . |

OTHER PUBLICATIONS

Patent Abstracts of Japan, vol. 10, No. 19 (P-423), Jan. 24, 1986 & JP 60 171,672 A, Sep. 5, 1985.
JP 4092254 A, published Mar. 25, 1992, Hard Disk Memory Device.
JP5342585, published Dec. 24, 1993, Information Reproducing Device.
Patent Abstracts of Japan, vol. 9, No. 9, Jan. 16, 1985 & JP-A-59-157869 (K.K. Sharp), Sep. 7, 1984.
Patent Abstracts of Japan, vol. 13, No. 104, Mar. 13, 1989 & JP-A-63 282983 (Fujitsu Ten Ltd.), Nov. 18, 1988.
Patent Abstracts of Japan, vol. 12, No. 34, Feb. 2, 1988 & Jp-A-62 185290 (Sony Corporation) Aug. 13, 1987.

*Primary Examiner*—Ayaz R. Sheikh
*Assistant Examiner*—Eric S. Thlang
*Attorney, Agent, or Firm*—William D. Miller; Mark A. Hollingsworth; Min Xu

[57] ABSTRACT

A multiple frequency zoned disk storage device in which data is read from and/or written to the disk at two or more discrete disk velocities is disclosed. The disk storage device includes a low power mode where information is read/written from/to the disk while the disk velocity is reduced to conserve power. The allocation track locations into zones on the drive reduces the number of zone bit frequencies the storage device must handle.

21 Claims, 12 Drawing Sheets

| ZONE | Radii (mm) | RPM 3600 FH 1.0000 POWER 1.0000 | 3339 0.9755 0.8175 | 3097 0.9516 0.6682 | 2873 0.9282 0.5462 | 2665 0.9005 0.4465 | 2472 0.8833 0.3650 | 2293 0.8616 0.2984 | 2127 0.8405 0.2439 | 1972 0.8199 0.1994 | 1830 0.7998 0.1630 |
|---|---|---|---|---|---|---|---|---|---|---|---|
| 1 | 27.55 | 6.8998 | 6.3999 | 5.9363 | 5.5062 | 5.1072 | 4.7372 | 4.3940 | 4.0757 | 3.7804 | 3.5065 |
| 2 | 25.55 | 6.3999 | 5.9363 | 5.5062 | 5.1072 | 4.7372 | 4.3940 | 4.0757 | 3.7804 | 3.5065 | 3.2524 |
| 3 | 23.70 | 5.9363 | 5.5062 | 5.1072 | 4.7372 | 4.3940 | 4.0757 | 3.7804 | 3.5065 | 3.2524 | 3.0168 |
| 4 | 21.98 | 5.5062 | 5.1072 | 4.7372 | 4.3940 | 4.0757 | 3.7804 | 3.5065 | 3.2524 | 3.0168 | 2.7982 |
| 5 | 20.39 | 5.1072 | 4.7372 | 4.3940 | 4.0757 | 3.7804 | 3.5065 | 3.2524 | 3.0168 | 2.7982 | 2.5955 |
| 6 | 18.91 | 4.7372 | 4.3940 | 4.0757 | 3.7804 | 3.5065 | 3.2524 | 3.0168 | 2.7982 | 2.5955 | 2.4075 |
| 7 | 17.54 | 4.3940 | 4.0757 | 3.7804 | 3.5065 | 3.2524 | 3.0168 | 2.7982 | 2.5955 | 2.4075 | 2.2330 |
| 8 | 16.27 | 4.0757 | 3.7804 | 3.5065 | 3.2524 | 3.0168 | 2.7982 | 2.5955 | 2.4075 | 2.2330 | 2.0713 |
| 9 | 15.09 | 3.7804 | 3.5065 | 3.2524 | 3.0168 | 2.7982 | 2.5955 | 2.4075 | 2.2330 | 2.0713 | 1.9212 |
| 10 | 14.00 | 3.5065 | 3.2524 | 3.0168 | 2.7982 | 2.5955 | 2.4075 | 2.2330 | 2.0713 | 1.9212 | 1.7820 |

GEOMETRIC PROGRESSION

FIG. 8A

| RPM | 3600 | 3399 | 3198 | 2997 | 2796 | 2595 | 2395 | 2194 | 1993 | 1792 |
|---|---|---|---|---|---|---|---|---|---|---|
| FH | 1.0000 | 0.9812 | 0.9617 | 0.9413 | 0.9200 | 0.8976 | 0.8741 | 0.8492 | 0.8227 | 0.7943 |
| POWER | 1.0000 | 0.8573 | 0.7282 | 0.6120 | 0.5081 | 0.4161 | 0.3353 | 0.2651 | 0.2049 | 0.1541 |
| ZONE | Radii (mm) | | | | | | | | | |
| 1 | 28.13 | 7.0455 | 6.6523 | 6.2591 | 5.8659 | 5.4726 | 5.0794 | 4.6862 | 4.2929 | 3.8997 | 3.5065 |
| 2 | 26.56 | 6.6523 | 6.2810 | 5.9098 | 5.5385 | 5.1672 | 4.7959 | 4.4246 | 4.0533 | 3.6821 | 3.3108 |
| 3 | 24.99 | 6.2591 | 5.9098 | 5.5604 | 5.2111 | 4.8618 | 4.5124 | 4.1631 | 3.8137 | 3.4644 | 3.1151 |
| 4 | 23.42 | 5.8659 | 5.5385 | 5.2111 | 4.8837 | 4.5563 | 4.2289 | 3.9015 | 3.5741 | 3.2468 | 2.9194 |
| 5 | 21.85 | 5.4726 | 5.1672 | 4.8618 | 4.5563 | 4.2509 | 3.9454 | 3.6400 | 3.3346 | 3.0291 | 2.7237 |
| 6 | 20.28 | 5.0794 | 4.7959 | 4.5124 | 4.2289 | 3.9454 | 3.6619 | 3.3784 | 3.0950 | 2.8115 | 2.5280 |
| 7 | 18.71 | 4.6862 | 4.4246 | 4.1631 | 3.9015 | 3.6400 | 3.3784 | 3.1169 | 2.8554 | 2.5938 | 2.3323 |
| 8 | 17.14 | 4.2929 | 4.0533 | 3.8137 | 3.5741 | 3.3346 | 3.0950 | 2.8554 | 2.6158 | 2.3762 | 2.1366 |
| 9 | 15.57 | 3.8997 | 3.6821 | 3.4644 | 3.2468 | 3.0291 | 2.8115 | 2.5938 | 2.3762 | 2.1585 | 1.9408 |
| 10 | 14.00 | 3.5065 | 3.3108 | 3.1151 | 2.9194 | 2.7237 | 2.5280 | 2.3323 | 2.1366 | 1.9408 | 1.7451 |

ARITHMETIC PROGRESSION

FIG. 8B

POWER SAVING METHOD AND APPARATUS FOR USE IN MULTIPLE FREQUENCY ZONE DRIVES

BACKGROUND OF THE INVENTION

The present invention is directed to a method and apparatus for saving power in zone bit recording (ZBR) drives, and in particular to a method and apparatus for carrying out operations in multiple zones at different spindle velocities.

One of the key components of some electrical devices is a place to store and read data. For example, compact disk players read data, such as music, from a plastic disk. Another example is a VCR which reads data from a tape. Computer systems also store and read large amounts of data. Typically computer systems employ a number of storage means to store data. One of the places where a computer can store data is in a disk drive which is also called a direct access storage device.

Although this invention is not limited to a direct access storage device one will be described by way of example. A disk drive or direct access storage device includes several disks which look similar to records used on a record player or compact disks which are used in a CD player. The disks are stacked on a spindle, much like several records awaiting to be played. In a disk drive, however, the disks are mounted to the spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Each track in a disk drive is further subdivided into a number of sectors which is essentially just one section of the circumferential track.

Storage of data on a magnetic disk entails magnetizing portions of the disk in a pattern which represents the data. To store data on a disk the disk is magnetized. In order to magnetize the magnetic layer, a small ceramic block which contains a magnetic transducer known as a write element is passed over the surface of the disk. More specifically, the write element is flown at a height of approximately six millionths of an inch from the surface of the disk and is flown over the track as the write element is energized to various states causing the track below to be magnetized to represent the data to be stored. In some applications, the write element is the same as the read element. Other applications use a separate write element and a separate read element.

To retrieve data stored on a magnetic disk, a read element located, in close proximity to the write element, is flown over the disk. The magnetized portions of the disk provide a signal from the read element. By looking at output from the read element, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read element and write element. This would be comparable to having a stereo that could play both sides of a record at once. Each side would have a stylus which played the particular side of the record.

Disk drives also have something that compares to the tone arm of a stereo record player. There are two types of disk drives, rotary and linear. Rotary disk drives have a tone arm that rotates much like a record player. The tone arm of a rotary disk drive, termed an actuator arm, holds all the transducers or read/write elements, one head for each surface of each disk supported in a structure that looks like a comb. Sometimes the structure is called an E-block. Like a tone arm, the actuator arms rotate so that the read element and write element attached to the actuator arm can be moved to locations over various tracks on the disk. In this way, the write element can be used to magnetize the surface of the disk in a pattern representing the data at one of several track locations. The read element is used to detect the magnetized pattern on one of the tracks of a disk. For example, the needed data may be stored on two different tracks on one particular disk, so to read the magnetic representations of data, the actuator arm is rotated from one track to another track.

It should be noted that this invention is not limited to use in disk drives using magnetic media but is useful in any device having rotating media. In this particular application, where magnetic media is described as an example it should be recognized that the invention would be useful in other storage devices which have different types of media or read and write elements.

The use of direct access storage devices (DASD), such as magnetic disk drives, in portable computers has increased significantly over the past several years. Such computers typically have a portable battery pack which provides power to the various components of the computer when the computer is used away from a power outlet. It is important that the battery pack used to supply power to the portable computer be compact and light weight. However, as the portable computers are increasingly used in locations where an external power source is unavailable, for example, traveling on an airplane, it is also increasingly important that the portable computers operate for significant periods of time between recharging of the battery pack.

The desire to achieve a compact and light weight design often competes with a desire for longer usage time of the computer between charging the battery pack. In order to increase operating time at the portable computer, various steps have been taken to reduce the power consumption of components used in the computer. Moreover, increased efforts have also been made to reduce power consumption of desk-top computers in order to more generally conserve energy resources. The Environmental Protection Agency now provides for power saving status to be granted to computers meeting certain standards. Thus, efforts to reduce power consumption of the various components of a computer have been increasingly employed. For example, the central processing unit (CPU), often includes some from of power management function to reduce clock frequency of the CPU when the computer is in a power savings mode. In general, a power saving mode may be invoked to reduce use of power by a component of the computer when the component is not being used.

In the case of memory storage devices various power savings techniques have been employed. For example, in disk drives, the spindle motor uses a large percentage of the total power. In order to conserve power, it has been proposed that the spindle speed of the disk drive be reduced or stopped when the disk drive is not being used by the portable computer. In a typical approach, a normal operating spindle velocity is used by the disk drive during read and write operations to the disk. When the power saving mode is initiated, for example, when the disk drive is not accessed over a predetermined period of time, the spindle velocity of the disk is reduced or stopped to conserve power. When an access operation to the disk drive is initiated, the spindle speed is increased until the disk is rotated at the normal operating velocity prior to beginning the read or write operation. In other words, the power saving mode is disengaged prior to the commencement of read and write operations.

Another increasingly important requirement of storage devices, including those used in portable computers, is that the devices have a high storage capacity. In order to conserve power and provide a light weight compact design, it is also desirable that the disks used in the drives be as small as possible. By using smaller disks, power is saved by reducing the size of the disk which the spindle motor must rotate. The increasing demand for high storage capacity while using smaller disks present competing interests to the disk drive developer.

One technique used to increase the storage capacity of a rotating disk is zone bit recording (ZBR). The principle behind ZBR is that at a constant spindle velocity, the linear speed of the disk as it moves past the transducer varies from the inner diameter to the outer diameter of the disk. In particular, the linear speed of the disk moving past a transducer positioned at the outer diameter of the disk is higher than when the transducer is positioned at the inner diameter. ZBR takes advantage of this higher linear velocity by increasing the frequency at which data is recorded to the disk at the outer diameter in order to increase the linear density of the recorded data to the maximum linear density limit for the particular DASD.

Ideally, to achieve maximum storage capacity, the write frequency could be selected as a function of the radial position of the head such that the maximum linear density of transitions used (e.g., data) at the outer diameter of the disk is the same as the density at the inner diameter of the disk. In such a system, the linear density of the data recorded on the disk is constant and equal to the maximum linear density limit regardless of the radial position on the disk at which the data is recorded. In practice, to achieve near optimum storage capacity, it is not necessary to change the density for each track location. Rather, the disk may be divided into a number of concentric zones made up of a band of adjacent track locations. Each zone has an associated frequency at which data is written to and read from the disk. The zone frequency is typically selected for each zone such that the linear density of data at the innermost track of each zone is constant and equal to the maximum linear density limit. In this manner, the overall storage capacity of the disk can be significantly increased.

SUMMARY OF THE INVENTION

Generally, the present invention provides an improved low power direct access storage device and method. In one particular embodiment, the present invention is implemented in the form of a memory storage device which includes a disk having N concentric zones, N being an integer greater than 1, provided around a surface of the disk. Data is stored in each zone such that a linear density of data at an inner track location of each zone is substantially constant. A variable speed motor may be connected to the disk to selectively rotate the disk at a plurality of discrete disk velocities and a transducer may be used to perform write and/or read operations to and from each of the zones at each of the plurality of discrete disk velocities.

In accordance with an aspect of the invention a storage device may be operated by rotating a disk at a first disk velocity, performing access operations to the plurality of concentric zones while rotating the disk at the first disk velocity, rotating the disk at a second disk velocity and performing access operations to the plurality of concentric zones while rotating the disk at the second disk velocity.

The invention may be advantageously implemented in a portable computer. The disk drive provides added value to the portable computer because it provides decreased power consumption.

The above summary of the present invention is not intended to present each embodiment or every aspect of the present invention. Rather, the invention will be understood by reference to the figures and the associated description which follow.

BRIEF DESCRIPTION OF THE DRAWINGS

The invention may be more completely understood in consideration of the following detailed description of various embodiments of the invention in connection with the accompanying drawings, in which:

FIGS. 8A and 8B, respectively, are tables depicting the geometrically and arithmetically located zone radii, flying height, power requirements and frequency as a function of varying spindle speed for a 2.5' disk drive.

Figure 1:
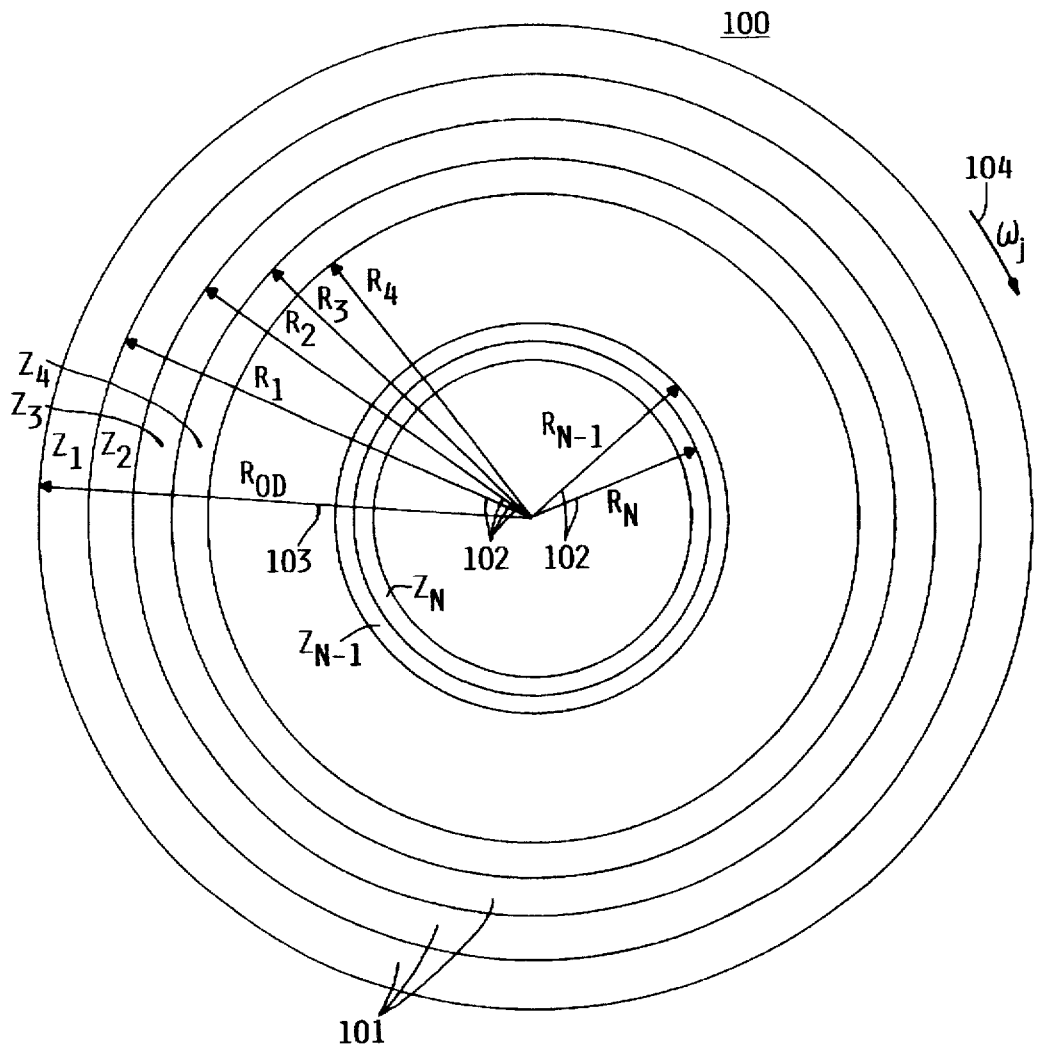
FIG. 1 illustrates a disk surface having a number of recording zones.

While the invention is amenable to various modifications and alterative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention provides an improved power saving mode for use in a storage device which is well suited for use in a multiple frequency zone (i.e., ZBR) drives. More particularly, the present invention provides an improved power savings mode of operation for a memory storage device, by allowing the storage device to be accessed while in the power savings mode. As described more fully below, when conservation of power is more critical to a user than the access speed to the data on the drive or when access operations to the storage device are relatively infrequent, the storage device may be operated in power savings mode to reduce power consumption. While the invention relates in general to direct access storage devices such as magnetic and optical disk drives, CD ROMs and the like, the exemplary embodiments provided below describe a disk drive for purposes of illustration. The implementation of the described features in other types of storage devices will be apparent from the description.

Figure 2:
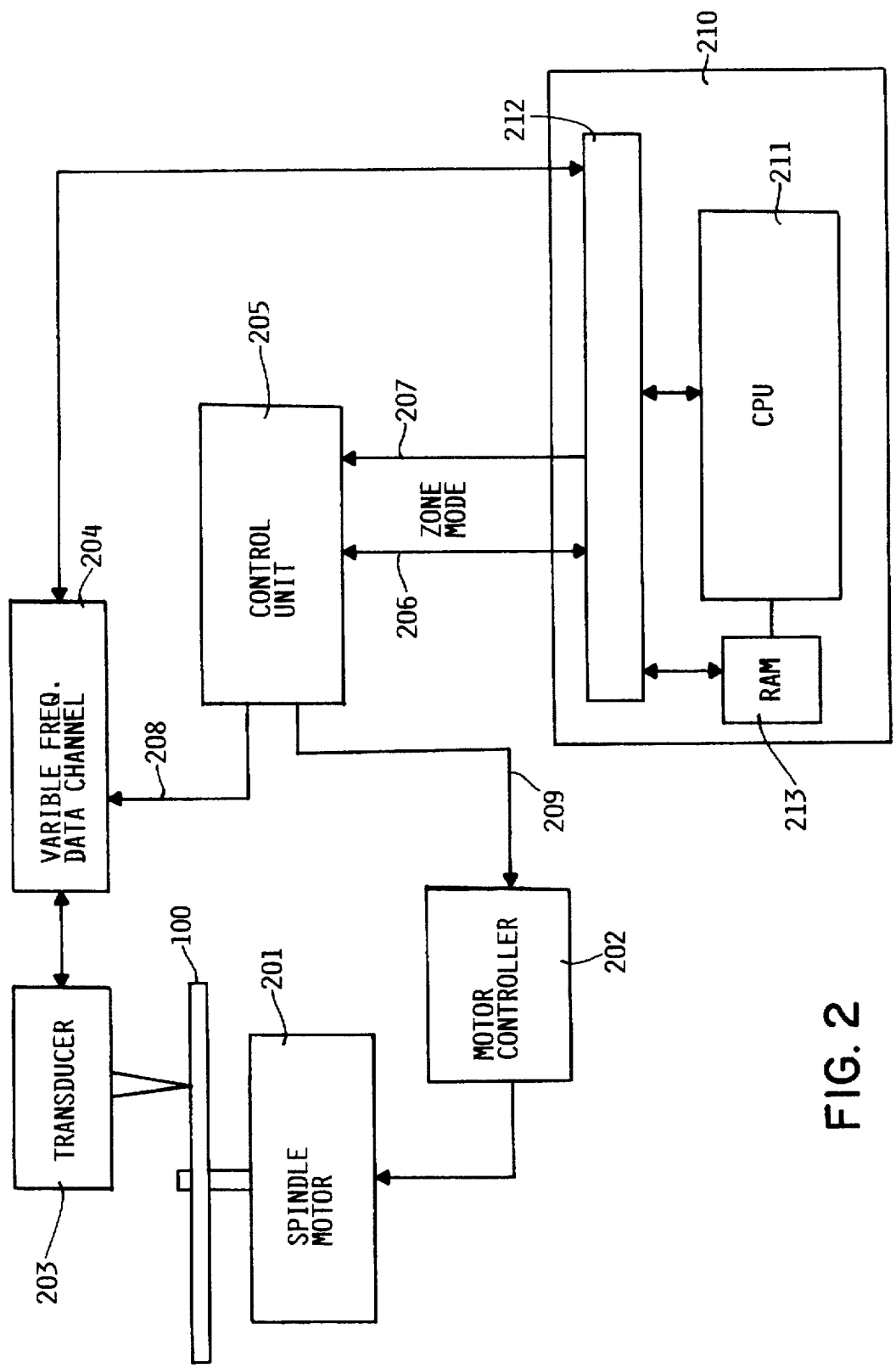
FIG. 2 depicts a block diagram which exemplifies an embodiment of the present invention.
Figure 3A:
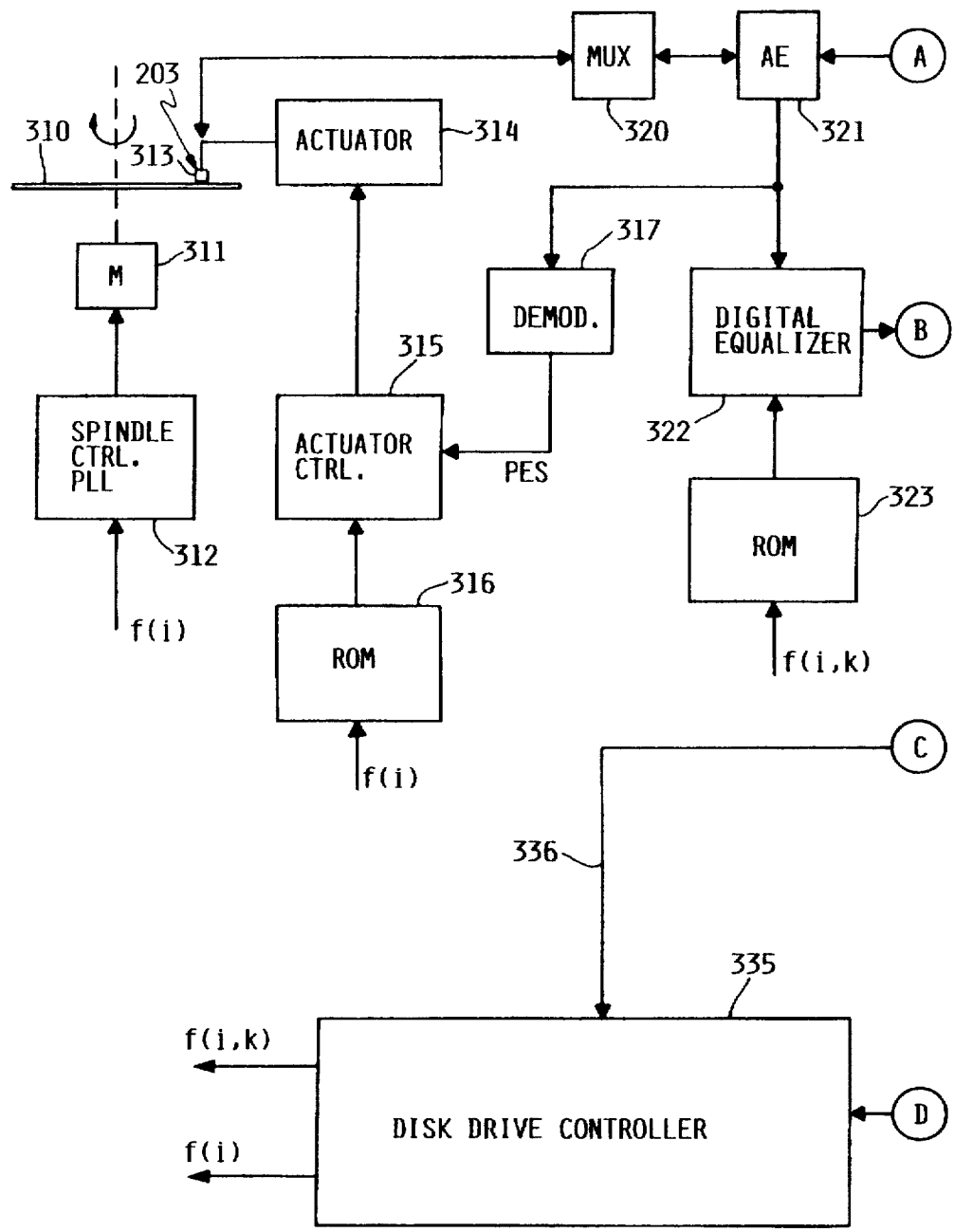
FIG. 3 depicts a more detailed block diagram exemplifying an embodiment of the present invention.
Figure 3B:
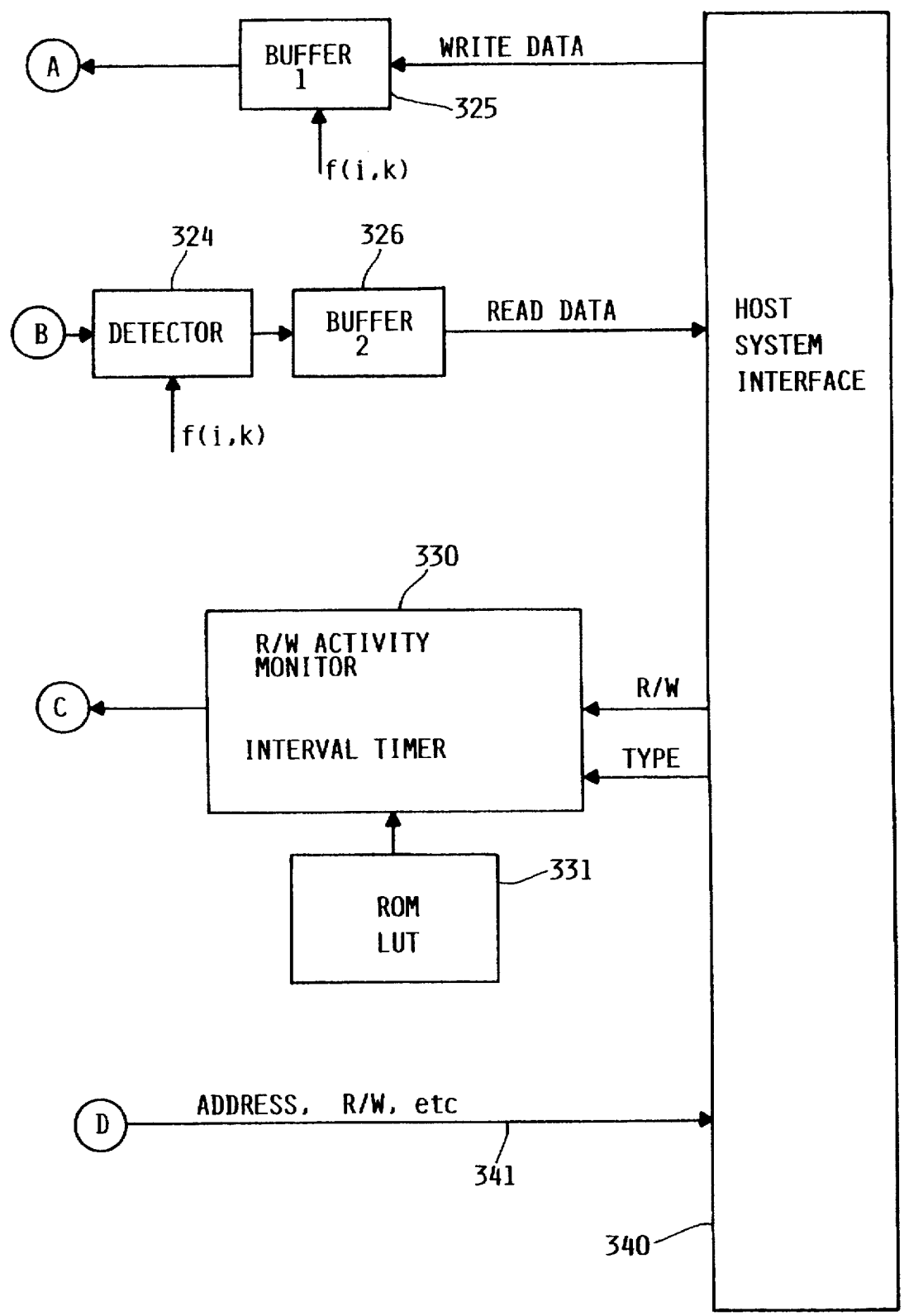

In FIGS. 1–3, various components of a disk drive are shown for the purpose of illustrating various features of the present invention. A diagram illustrating a disk surface using multiple frequency recording zones (i.e., ZBR) is illustrated in FIG. 1. In FIG. 1, a disk 100 has N zones 101 each made up of a band of tracks or track locations (not shown). The zones 101 progress from zone $Z_1$ at the outer diameter of the disk to zone $Z_N$ at the inner diameter of the disk. The zones 101 may be defined by the inner radii 102 of the zones. The radius $R_i$ corresponds to the inner radius of zone $Z_i$. The radius 103 of the disk defines an outer diameter $R_{OD}$ of the disk.

The disk 100 is rotated by a spindle motor at a velocity $\omega_j$ in the direction of arrow 104. As described more fully below, the disk may be rotated at two or more discrete velocities $\omega_j$. The particular velocity $\omega_j$ used can be determined on the basis of the operating mode in which the disk drive is being used.

As described more fully below, data may be written to the each of the zones at different write frequencies while the disk is rotated at a constant velocity, as is conventionally know in ZBR drives, such that all write operations are carried out at the same spindle velocity with a write frequency selected according to the zone. Alternatively, data may be written to the disks at different spindle speeds. When different spindle speeds are used for write operations the write frequency for a particular zone is selected such that the linear density for data written to the inner track of each zone is substantially constant and substantially equal to the maximum linear density limit for the particular DASD.

Data may also be read from the disk at two or more spindle velocities. Thus, the linear data rate as the disk is read, (i.e., the rate at which data is presented to the read head) also varies as the speed of the spindle motor is changed. In other words, the rate at which data bits, represented by transitions in the signal, are presented to the transducer for a given zone varies as the spindle motor speed changes. Hereinafter, the rate at which data is presented to a transducer at a given spindle velocity will be referred to as the "zone bit frequency". Thus, as used herein, the term "zone bit frequency" is to represent the rate at which bits of data are presented to (or written by) the transducer. The zone bit frequency is a function of both the linear density of the data in the zone and the rotational speed of the disk (i.e., the spindle velocity).

The components of a disk drive used to control the spindle velocity and operating frequency of a data channel are illustrated in FIG. 2 in block diagram form. In FIG. 2, the disk 100 is rotated by a spindle motor 201. The rotational velocity of the spindle motor 201 is controlled by a motor controller 202. The motor controller 202 is provided to rotate the spindle motor 201 and hence the disk 100, at a number of known, discrete velocities. A transducer 203 is positioned adjacent the disk 100 to read and/or write information to and from the surface of the disk 100.

The transducer 203 may be mounted to, for example, a rotary actuator (not shown) to position the transducer over a desired track location. The radial position of the transducer 203 relative the disk determines which zone of the disk 100 is being accessed. The transducer 203 is connected to a variable frequency data channel 204 which may be used to read and write signals from and to the disk at an appropriate zone bit frequency for a selected zone and disk speed. In a read operation, for example, the transducer 203 provides a raw signal of information read from the disk to the data channel 204 which extracts data from the signal at the appropriate frequency for the given zone and spindle speed. The data read from the disk 100 is supplied from the variable frequency data channel 204 to a processing interface 212 which processes the signal for use by the CPU 211 of a computer using the disk drive.

A control unit 205 is connected to the variable frequency data channel 204 and the motor controller 202. The control unit 205 receives a zone control signal 206 and a mode control signal 207 from the processing interface 212. The zone control signal 206 indicates the zone at which the transducer 203 is performing an access operation. This information can be obtained by any of the conventionally known methods for determining head position. For example, zone information may be obtained from the transducer as it reads servo information (e.g., Gray code information) from the surface of the disk.

The mode control signal 207 informs the control unit 205 of an operating mode of the disk storage device. For example, if the disk storage device is operating in a power savings mode, this information is provided to the control unit 205 as the mode control signal 207.

On the basis of the mode control signal 207, the control unit supplies a motor speed control signal 209 to the motor controller to cause the spindle motor 201 to rotate the disk at the appropriate velocity. The control unit also determines, on the basis of the zone control signal 206 and the mode control signal 207, the appropriate zone bit frequency for accessing the disk zones 101. The data rate (zone bit frequency) is determined on the basis of both the mode control signal 207, which reflects the spindle motor 201 velocity and the zone control signal 206 which reflects the relative rate at which the data is written to the disk at the particular zone. The appropriate zone bit frequency is communicated to the variable data channel 204 on line 208 from the control unit 205.

The processing interface 212 processes information and provides an interface to the main CPU 211 of the computer 210 using the disk storage device. The operation of this circuitry may be understood from the detailed example provided below.

A number of different mechanisms may be used by the system to determine the appropriate mode of operation. A power savings mode may be entered, for example, in response to user input which specifies a desire to operate in a low power mode. For example, the user may be using the computer on a long airplane flight where low battery power consumption is more important than access speed to the disk drive. Alternatively, a power savings mode may be automatically entered when activity in the disk drive falls below a particular threshold or if the battery power level is below a threshold. It is noted that monitoring activity level of the disk drive can be accomplished using the techniques generally known in the art. However, in conventional power saving disk drive devices, data is not written to or read from the disk while the speed of the spindle motor is reduced. Thus, in addition to determining when a power savings mode should be initiated the system must also know when to exit the power savings mode. In contrast to the conventional power savings approach which automatically exits the power savings mode when any access is made to the disk drive, in accordance with an aspect of the invention a more sophisticated mechanism is employed to determine when the power savings mode should be initiated and terminated.

In certain environments, it may be desirable to operate the disk drive in a low power mode only for read operations and resume full speed when a disk write operation is initiated. Such an approach may be used where it is desired to write data only at the higher spindle speed. For example, as the spindle speed is slowed, the time between servo sectors is increased, thereby decreasing the sampling rate of servo information. A lower sampling rate may result in lower servo stability increasing track mis-registration (TMR). Typically, a higher TMR is acceptable for read operations than for write operations. Thus, for certain configurations, it may be desirable to increase the speed for write operations in order to decrease TMR. Reduced power consumption may still be realized since in a typical use of a disk drive there are 5-10 read operations for every write operation.

If write operations are to be carried out only at the higher spindle speeds, it is necessary to resume full speed prior to initiating a write operation to the disk. If write access operations to the disk are minimal, a simple process of resuming full speed on the initiation of a write operation may produce significant power savings. Alternatively, information to be written to the disk may be saved in a temporary memory such as a random access memory 213 (RAM) used by the computer, upon initiation of a write operation. The data in the RAM 213 may then be transferred to the disk at a later point in time, when the normal operating speed of the spindle motor is resumed. Some form of data hierarchy, such as that used by cache memory schemes, may be used to determine whether the data on the disk or in the RAM should be used for read operations.

The above described temporary storage of data to be written to the disk may be advantageous in a system where a user manually selects a power saving mode and where write operations are not to be carried out at slower spindle speeds. In this mode, the spindle motor may be generally operated at a lower spindle velocity. Periodically, the spindle motor velocity could then be increased to the normal operating speed, at which time the data is transferred from the RAM 213 to the disk. After the data is written to the disk the reduced spindle speed may be resumed. It is noted that instead of the RAM 213, any other type of temporary storage may be used. For example, a temporary memory may incorporated directly into the disk storage device to serve this function.

In another alternative embodiment, the power savings mode may be invoked and maintained when the average number of disk access operations, including read and/or write operations, occurring during a predetermined time period fall below a set threshold. A give spindle speed may be selected which corresponds to a particular activity level.

A more detailed circuit diagram exemplifying various components which may be used to implement a low-power disk storage device is illustrated in FIG. 3. In FIG. 3, a recording head 313 is positioned to read and write information from and to the surface of disk 310. It is noted that while only a single disk is illustrated in FIG. 3, multiple disks and heads may be used. An actuator assembly 314, including a voice coil motor (VCM), is provided to move the head 313 relative to the rotating disk 310. A spindle motor 311 is provided to rotate the disk 310. The spindle motor 311 is controlled by a spindle controller 312. The spindle controller 312 may be implemented with a phase locked loop (PLL) such that the speed of the spindle motor 311 may be controlled by applying a frequency control signal f(i) to the spindle controller 312. It is noted that the various control elements illustrated in FIG. 3, while shown as discrete blocks may be implemented on a microprocessor using microcode. Moreover, a number of different microprocessors may be used, each implementing one or more of the described functions. The present description describes the functional operation of the various elements whether implemented as microcode or as discrete circuits.

An adaptive actuator controller 315 is provided to control the actuator 314. The actuator controller 315 uses a set of coefficients stored in a read-only memory (ROM) 316. The ROM 316 stores one set of coefficients for each discrete rotational velocity of the disk 310. It should be noted that the various coefficients used in a storage device will typically be tuned for the particular storage device at final test stages of the manufacturing process. The disk velocity is changed under control of the frequency control signal f(i) from one discrete velocity to another. As the disk velocity is changed, the actuator controller 315 loads a new set of a coefficients corresponding to the new disk velocity. The different coefficients are required because of the change in sampling rate of servo information formed by transducer 313 and servo patterns written on equispaced and radial sectors on the disk and decoded by demodulator 317 to produce a position error signal (PES). The coefficients are used to adjust the dynamic operation of the adaptive actuator controller 315 thereby optimizing actuator access and tracking performance. The position error signal is used for servo control to keep the head 313 aligned over the correct track location. If the disk 310 is slowed down, for example, the sampling of the position error signals will be slower than when the disk 310 is rotated at the faster nominal speed. The adaptive actuator controller 315 must be dynamically reconfigured to work with the proper sampling rate of the position error signal.

Information read from or written to the disk 310 passes through a multiplexer 320. The multiplexer 320 selects a head from various heads respectively corresponding to multiple disk surfaces (only one head 313 is shown in FIG. 3). The multiplexer 320 is coupled to the arm electronics (AE) module 321. The arm electronics module 321 is coupled to buffer 325 to receive data to be written the disk during a write operation. Buffer 325 is coupled to a host system interface 340 which in turn is coupled to the host system such as the processing unit of a portable computer. Data is typically passed from the host system interface 340 to the buffer 325 at a fixed rate (i.e., at a fixed number of bytes-per-second). The data is then stored in buffer 325. The data is clocked from the buffer 325 to the disk via the arm electronics module 321 and the multiplexer 320 at a rate (or frequency) which depends on the disk velocity and the zone in which the data is to be written. Thus, the buffer is provided with a control signal f(i,k) which is dependent upon the disk velocity denoted by "i" and the zone denoted by the letter "k". In other words, write data enters the buffer at constant speed and is output at a variable speed dependent upon disk velocity and zone information.

In a read operation, using head 313, for example, data is read and passed to the multiplexer 320, amplified by the AE module 321 and then provided to a digital equalizer 322. The adaptive digital equalizer (filter) 322 compensates for amplitude variation in bit frequency arising, for example, in the head 313 and/or the arm electronics module 321. The digital equalizer 322 amplifies all frequencies of the recorded signals such that the overall amplification of each frequency is of the same amplitude. The digital equalizer 322 is coupled to a ROM 323 to receive a set of coefficients corresponding to the spindle speed (disk velocity) and the zone from which the data is read in response to the control signal f(i,k). The coefficients are precalculated values to be used to optimize the operation of the digital equalizer 322.

The output of the digital equalizer 322 is provided to the detector 324. The detector 324 is also provided with the control signal f(i,k) to optimize the clocking and detection operation of the detector on the basis of the spindle speed and the particular zone from which the data was read. The detector 324 detects data bits in the signal read using the head 313. Once the data bits now have been detected, error correction for soft errors may be further carried out in the detector 324. The data may then be passed into the buffer 326 and subsequently read from the buffer 326 to the host system interface 340 at a frequency which is accepted by the interface. This frequency, for example, may be the same as the frequency at which write data is received by buffer 325 from the host system interface 340.

A demodulator 317 is also shown receiving the output from the arm electronics module 321. The demodulator 317 extracts servo information from a signal read by the head 313 from equispaced and radial servo patterns written on the disk surface. From the servo information the position error signal (PES) is derived and is provided to the actuator controller 315 to control the positioning of the head as described above. A detailed analysis of the above operation is provided in U.S. Pat. Nos. 5,285,327 entitled "Application for Controlling Reading and Writing in a Disk Drive", issued Feb. 8, 1994; 5,440,474 entitled "Magnetic Recording disk with Equally Spaced Servo Sectors Extending Across Multiple Data Bands", issued Aug. 8, 1995; and 5,210,660 entitled Sectored Servo Independent of Data Architecture, issued May 11, 1993.

The control signals f(i) and f(i,k) are generated by a disk drive controller 335. The disk drive controller 335 is coupled to communicate with the host system interface 340 as indicated by line 341. The host system interface 340 provides addressing information, read/write commands designating the type of operation to be performed, and the like, to the disk drive controller 335. The address information may include, for example, a head number, a cylinder number or track number as well as a data sector number. The disk drive controller 335 may also communicate information to the host system interface 340. For example, the disk drive controller 335 may communicate status information to the host system interface along line 341. When the disk drive is initially powered up, the controller may perform operations independent of the host. While performing such operations the disk drive controller 335 may inform the host system interface 340 that the disk drive is busy and will further notify the host system interface when the drive is ready to perform access operations.

The disk drive controller 335 also receives a control mode signal 336 indicative of a desired operating frequency for the drive. This control mode signal 336 will indicate, for example, whether the disk drive should be operated at a lower spindle speed to conserve power. The control mode signal 336 may be used to control, for example, a variable frequency oscillator in the disk drive controller 335. The frequency of this oscillator may then be used as a master frequency to control other elements in the disk drive. For example, the frequency of the oscillator may be provided to the phase locked loop (PLL) of the spindle controller 312 to control the spindle speed. The control mode signal 336 is determined on the basis of a mode of operation which in which the disk drive is to be operated.

By way of example, the internal variable frequency oscillator may be controlled to a desired frequency on the basis of the type of the operations that are being called for by the host or the activity level of such operations. If, for example, there is high activity in the disk drive, the activity monitor 330 may instruct the disk drive controller 335 via control mode signal 336 to operate at full speed. Certain types of operations, such as interactive operations, may also be recognized by the activity monitor as needing to operate at full speed. Further, a manual power savings mode selection entered by the user into the host system may be passed to the activity monitor. In response to the power savings mode selection the control mode signal 336 may be set to lower the spindle speed of the disk drive regardless of the activity level.

The activity monitor 330 may include an interval timer used to monitor activity levels within a set interval. The activity monitor 330 may also monitor for read, write or other types of operations from the host system. The system may determine that based on the absence of the monitored operations for a given period of time that the spindle speed should be slowed down. Depending on then the length of time incurred without the specified activity the control mode signal 336 may preferably instruct the disk drive controller 335 to slow the spindle speed over a number of increments or steps. It should be appreciated that the spindle speed can not be instantaneously changed. Moreover, while changing the speed of the spindle from one value to another read and write operations cannot be carried out. Thus, if the disk drive is in the process of changing spindle motor speed, the disk drive controller provides a short "busy" signal along line 341 to the host system interface to place the system in a wait state until the desired spindle velocity is achieved.

In order to eliminate or reduce the waiting time while changing spindle speed, the host system may provide an indication to the disk drive controller when high disk drive activity is anticipated for future operations. In response to such an indication, the spindle speed may be increased prior to initiation of the high activity disk drive access operations. Information used by the activity monitor 330 is stored in the ROM 331 which may include a look-up table (LUT). The look-up table can be referred to determine whether a particular type of activity typically requires very high, high, medium high, average, etc. disk drive activity. For example, operations such as search operations of large databases, operations heavily using graphic images, video games, and the like, typically all require high disk drive activity. Initiation of interactive operations, for example, a "spell check" operations may also indicate a high activity level. The look-up table may also include a desired operating frequency associated with a particular level of activity. The activity monitor 330 may also include some form of alterable memory which can have values representing levels of activity set by a user, providing additional flexibility for initiating a power savings mode.

The activity monitor 330 also receives a signal from the host system interface 340 indicating the type of information being read from or written to the disk. For example, certain types of information such video information or interactive types of information, may require faster response times for access operations. This type indicator may be used to ensure that a satisfactory spindle speed is used for the type of information being read.

The activity monitor 330 may also be provided with a signal indicating battery power level from the host system interface 340 where the host system is operating on battery power. When the battery power level is below a predetermined set value, the system may be placed into a low power mode until adequate power levels are resumed by for example, hooking up to a power an AC power source or changing the battery.

As described above, as the spindle speed changes the read frequency changes for the various zones. This increases the overall complexity of the system. For example, in the circuit described above, for each discrete spindle velocity the digital equalizer (filter) 322 must be loaded with filter configuration data for each zone from ROM 323. The configuration data is unique for each different zone bit frequency. Thus, as the number of zones and discrete spindle velocities used by the storage device increase, the number of different zone bit frequencies also increases. An increase in the number of different zone bit frequencies is even more problematic when an analog or hybrid digital/analog data channel is used. As described more fully below, such a channel must include separate analog front end components such as resistors and capacitors for each different zone bit frequency used, increasing significantly the cost and size of the read channel. Moreover, in certain smaller form factor disk drives the needed space may not be available.

In view of the above considerations, it is desired that the number of different zone bit frequencies used by a storage device performing access operations at different spindle speeds be minimized. As described more fully below, it has been discovered in connection with the present invention that by special partitioning of the tracks into zones the complexity of the system may be decreased.

Referring to FIG. 1, an operating frequency $f_i$, in hertz (Hz), for zone i may determined by the relationship $$f_i = d_i (2\pi r_i \omega_j / 60)$$

where $d_i$ is the linear density at $r_i$ in zone $z_i$, $r_i$ is the inner radius of zone $z_i$, and $\omega_j$ is the discrete j-th disk annular velocity in revolutions per minute (RPM). This equation may be reduced to $$f_i = 0.1047 d_i r_i \omega_j.$$

and assuming that the maximum linear density for each zone is constant (i.e., $d_i = d_0$) for zones of equal width, the equation becomes $$f_i = 0.1047 d_o r_i \omega_j.$$

In accordance with one embodiment of the invention, a specific allocation of tracks into zones, by selecting the radii for the inner track for each zone is used to minimize the complexity and cost associated with a read channel. While the reduced spindle velocity is described for the purposes of saving power in battery based applications, the specific partitioning of tracks may be advantageously used in other applications as well. For example, high performance drives may use different spindle velocities for different applications. A "lazy tape backup" of a drive may also be carried out at reduced velocity in businesses where the system is actively used for only part of the day (e.g. 12 hours).

In accordance with an embodiment of the invention, the inner track radii defining each zone are selected as a geometric progression which is a function of radius. As described more fully below, this method of banding tracks into zones provides for a high degree of overlap in zone bit frequencies between zones as the spindle velocity is reduced. In general, the inner radius $r_i$, defining each zone, is determined according to a geometric progression which maintains a substantially constant ratio of radii between adjacent bands or zones. In other words, $r_i/r_{i+1}$ is substantially equal to K, where K equals a constant.

The advantages obtained using such an allocation will be apparent from the examples provided below. Using this method, a drive having N zones and operating at M different discrete spindle (disk) speeds will have a total number of different required zone bit frequencies equal to N+M−1. For example, a drive having 10 recording zones and operating at 10 discrete spindle speeds will require channel capable of handling 19 (i.e., 10+10−1=19) different zone bit frequencies.

In contrast, the number of different zone bit frequencies required for a disk banded according to a simple arithmetic progression is determined according to the relationship N+(((M*M)−N)/2). In the above example, the number of zone bit frequencies which the channel must handle equals 55 (i.e., 10+(((10*10)−10)/2)=55). Thus, partitioning the tracks into zones in accordance with a geometric progression offers significant advantages in terms of reduced channel complexity and cost.

The advantages obtained by partitioning the tracks into zones according to a geometric progression in comparison with an arithmetic progression will better understood by the following discussion in connection with FIGS. 4–8.

Consider a disk having the inner band radii $r_i$, of each zone, follow a geometric progression. This may be expressed as $$r_i = r_{OD}^{1-ip}, \text{ for } i=1,2,\ldots,N,$$

where $\rho$ is a coefficient for the progression.

The ratio between two adjacent zone radii $r_i$ and $r_{i+1}$, is constant providing the relationship:

$$r_i/r_{i+1} = r_{OD}^{\rho},$$

for $i=1,2,\ldots,N-1$.

For a disk having an inner radius $r_{ID}$, the coefficient, $\rho$, for a given number of data bands can be determined as follows:

$$\ln(r_{ID}) = (1-N\rho) \ln(r_{OD}),$$

which may be rewritten as:

$$\rho = 1/N(1-\ln(r_{ID})/\ln(r_{OD})).$$

By way of example, consider a 2.5 inch disk divided into 10 zones (N=10) and having an inner radius $r_{ID}$ of 14 mm, an outer radius $r_{OD}$ of 29.7 mm. The value of $\rho$ for a disk having these dimensions can be calculated as follows:

$$\rho = 1/10(1-\ln(14)/\ln(29.7)) = 0.022178.$$

Using this value for $\rho$ the inner radius of each of the 10 zones will be determined as the geometric progression:

$$r_i = r_{OD}^{(1-0.022178i)}.$$

By way of contrast, the inner radii of each zone may be determined as an arithmetic progression. Here the difference between two adjacent inner zone radii $r_i$ and $r_{i-1}$ is a constant b providing the relationship:

$$r_i - r_{i+1} = b,$$

In this case, the radii $r_i$ can be expressed as $$r_i = r_{i-1} - b,$$

which yields the following radii $$r_1 = r_0 - b;$$
$$r_2 = r_1 - b = r_0 - 2b;$$
$$r_3 = r_2 - b = r_0 - 3b;$$
$$\cdots$$
$$r_k = r_{k-1} - b = r_0 - kb.$$

Recalling the expression $f_i = 0.1047 d_o r_i \omega_j$ and by substitution, the following equation for $f_i$ may be written:

$$f_i = 0.1047 d_o (r_o - ib) \omega_j.$$

This equation can also be written as $f_i = f_{0j} - i\Delta f_{0j}$ where $f_{0j} = 0.1047 d_o r_0 \omega_j$ and $\Delta f_{0j} = 0.1047 d_o b \omega_j$. Thus, a general equation for the zone bit frequency can be expressed as $$f_{ij} = (k_0 - i\Delta k) \omega_j$$

where $k_0 = 0.1047 d_o r_0$ and $\Delta k = 0.1047 d_o b$.

When the disk is rotated at full speed (i.e., when $\omega = \omega_1$ and $j=1$), the following relationship can be derived:

$$f_{11} = (k_0 - \Delta k)\omega_1;$$
$$f_{21} = (k_0 - 2\Delta k)\omega_1;$$
$$f_{31} = (k_0 - 3\Delta k)\omega_1;$$
$$\cdots$$
$$f_{i1} = (k_0 - i\Delta k)\omega_1.$$

At a lower speed, when $\omega = \omega_2$ and $j=2$, the frequencies can be calculated as:

$$f_{12} = (k_0 - \Delta k)\omega_2;$$
$$f_{22} = (k_0 - 2\Delta k)\omega_2;$$
$$f_{32} = (k_0 - 3\Delta k)\omega_2;$$
$$\cdots$$
$$f_{i2} = (k_0 - i\Delta k)\omega_2$$

In order to reduce complexity of the read channel, it is desirable to have $f_{12} = f_{21}$ so that all but one of the frequencies at $\omega_1$ are reusable at the lower speed $\omega_2$. For this to occur, $(k_0 - \Delta k)\omega_2$ must equal $(k_0 - 2\Delta k)\omega_1$. It is also desired that $f_{22} = f_{31}$, which means that $(k_0 - 2\Delta k)\omega_2 = (k_0 - 3\Delta k)\omega_1$.

For zone i, we need $f_{i2} = f_{(i+1)1}$ which means that $(k_0 - i\Delta k)\omega_2 = (k_0 - (i+1)\Delta k)\omega_1$. The above constraints can be written as $\omega_2 = [(k_0 - (i+1)\Delta k)/(k_0 - i\Delta k)]\omega_1$, and for the $j^{th}$ speed $\omega_j$, the relationship may be expressed as $\omega_j = [(k_0 - (j+1)\Delta k)/(k_0 - \Delta k)]\omega_0$.

The power savings associated with lowering the spindle speed can be determined by examining the spindle power requirement as a function of the speed. This value may empirically be expressed as:

$$P_j = (\omega_j/\omega_0)^{2.68} P_0.$$

where $P_0$ is the power dissipated in the spindle at speed $\omega_0$ and $P_j$ is the power required to spin the spindle at speed $\omega_j$.

If we substitute the relationship for $\omega_j$ into this equation, the power savings may be expressed as:

$$P_j = [(k_0 - (j+1)\Delta k)/(k_0 - \Delta k)]^{2.68} P_0.$$

Consider the example described above using a 2.5" disk having the dimensions $r_{ID} = 14$ mm and $r_{OD} = 29.7$ mm with 10 zones divided into equal sized bands of approximately 1.57 mm (i.e., $b = (29.7-14)/10$). Assuming a linear density of data on the inner radius of each zone of 135 kilobits-per-inch (i.e., $d_0 = 5315$ bits per mm), the value of $k_0 = 0.1047 d_0 r_0 = 16527.47$ and $\Delta k = 873.67$. In this case, some of the spindle velocities, using the arithmetic progression for the inner band radii, may be determined as:

$$\omega_1 = [(k_0 - 2\Delta k)/(k_0 - \Delta k)]\omega_0 = 0.9442 \, \omega_0$$
$$\omega_2 = [(k_0 - 3\Delta k)/(k_0 - \Delta k)]\omega_0 = 0.8884 \, \omega_0$$
$$\omega_3 = [(k_0 - 4\Delta k)/(k_0 - \Delta k)]\omega_0 = 0.8326 \, \omega_0$$
$$\omega_4 = [(k_0 - 5\Delta k)/(k_0 - \Delta k)]\omega_0 = 0.7768 \, \omega_0$$
$$\omega_5 = [(k_0 - 6\Delta k)/(k_0 - \Delta k)]\omega_0 = 0.7209 \, \omega_0$$
$$\omega_6 = [(k_0 - 7\Delta k)/(k_0 - \Delta k)]\omega_0 = 0.6651 \, \omega_0.$$

Using the above relations, the following comparisons can be made between the geometric and arithmetic progression methods of selecting the inner band radii of the various zones. It is noted, that the storage capacity of a disk using the above-described geometric progression is substantially the same as that of a disk using the arithmetic progression.

Figure 4:
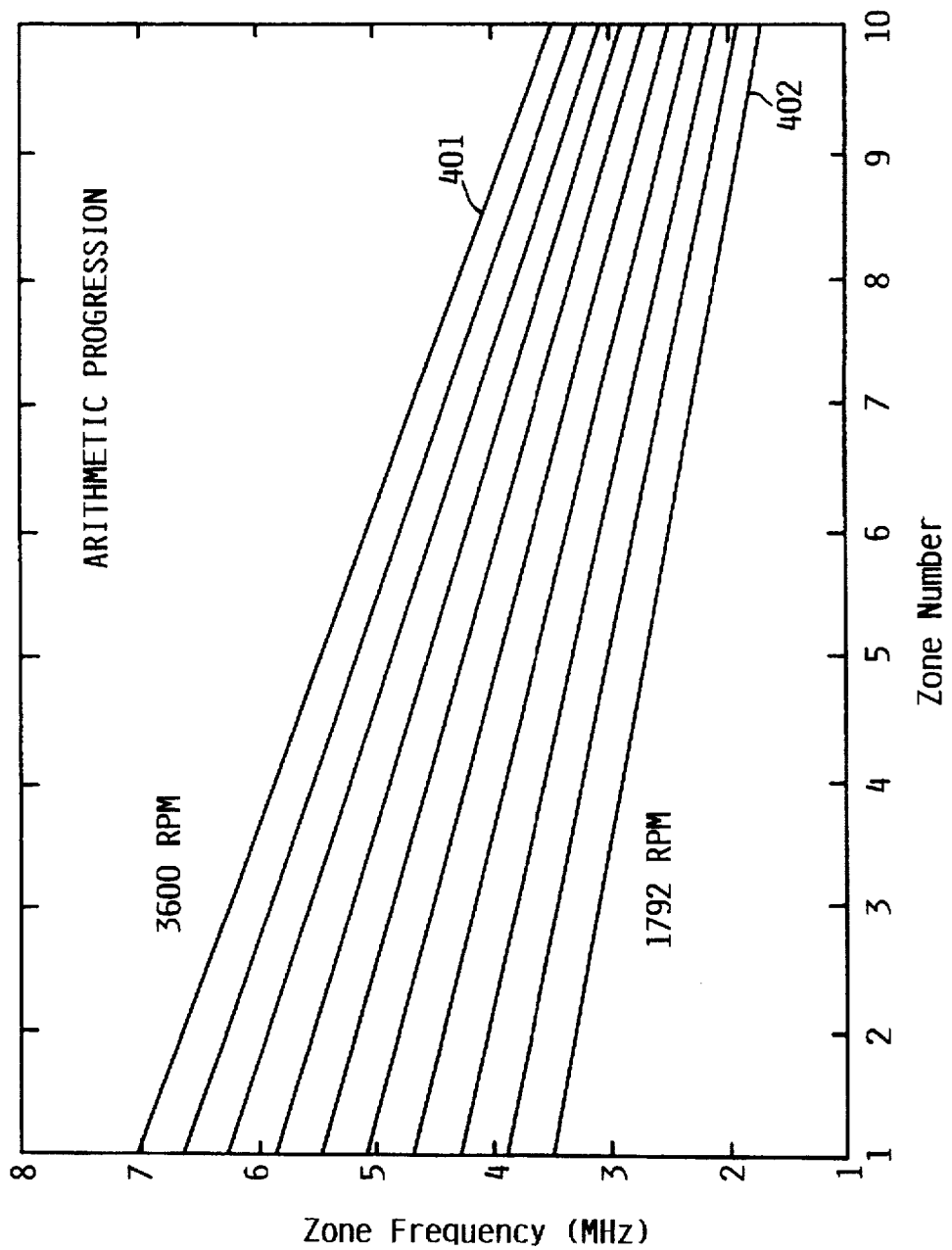
FIG. 4 illustrates a relationship between zone frequency and spindle motor velocity for tracks partitioned into zones according to an arithmetic progression.
Figure 5:
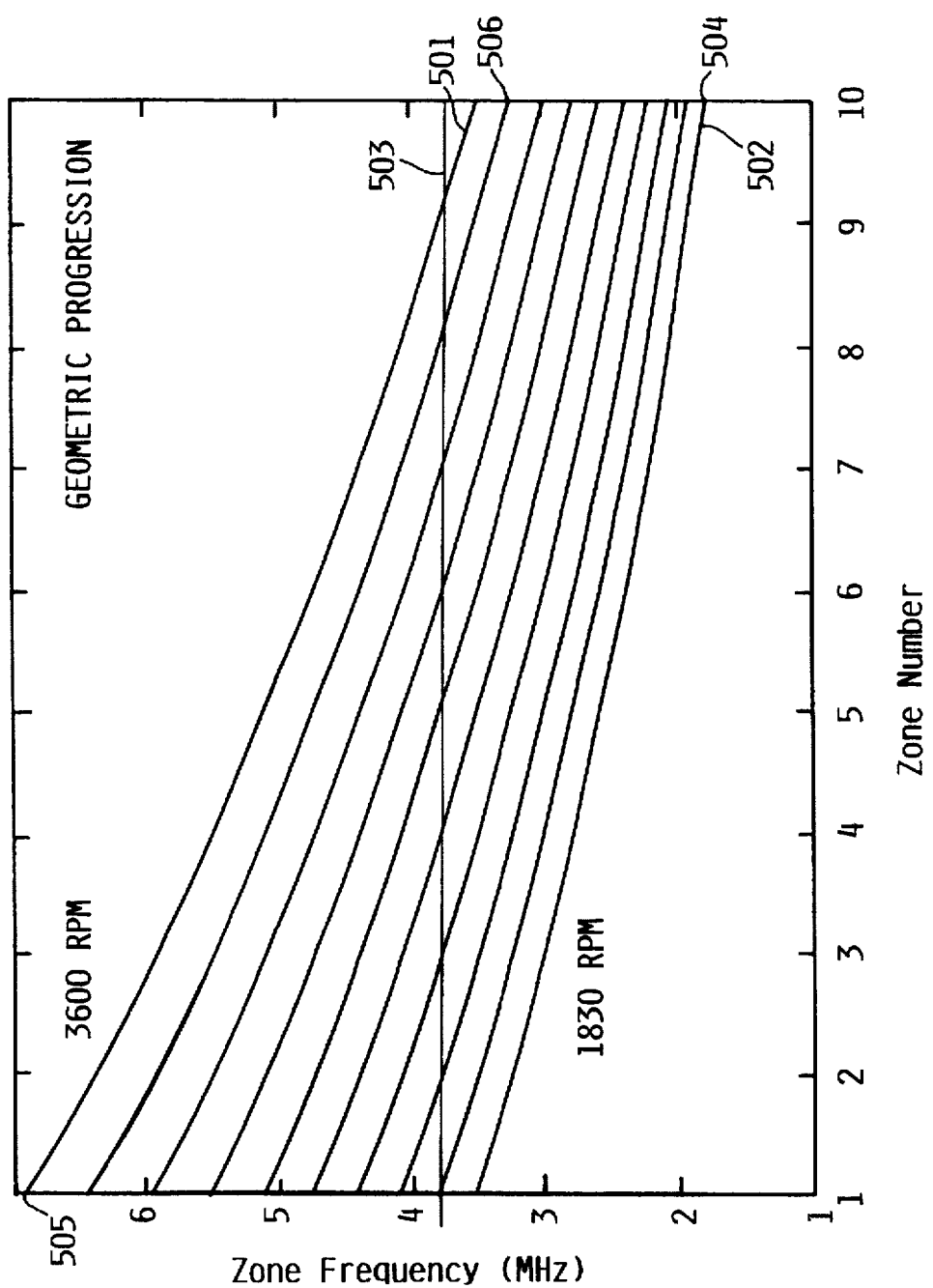
FIG. 5 illustrates a relationship between zone frequency and spindle motor velocity for tracks partitioned into zones according to a geometric progression.

In FIG. 4 and 5, zone data rate frequencies versus the zone index position are graphed as a function of varying spindle motor speeds for zones banded using the arithmetic progression and the geometric progression, respectively. The spindle motor speed is varied over ten discrete drive speeds between a nominal speed of 3600 revolutions per minute (RPM), represented by lines 401 and 501 to 1792 RPM, represented by line 402 in the case of the arithmetic progression (FIG. 4) and 1830 RPM, represented by line 502 in the case of the geometric progression (FIG. 5).

A comparison of FIGS. 4 and 5 illustrates various advantages obtained by using a geometric progression to allocated tracks to zones. When the graph in FIG. 5 is viewed horizontally, it is noted that the zone bit frequencies line up along a horizontal line. For example, the zone bit frequency of 3.78 megahertz (MHz) extending along line 503 is used by each of zones 1–9 at different discrete spindle motor speeds. Moreover, all but two zone bit frequencies indicated at points 504 and 505 (corresponding to frequencies 1.78 MHz and 6.90 MHz) are used by more than one zone. It is further noted that the frequencies also align vertically. This indicates that as the drive speed is reduced, the zone bit frequencies are shifted toward the outer diameter (OD) of the disk.

Referring to FIG. 8A, the following example illustrates an advantage obtained by using the geometric progression to allocate track locations to zones. In zone number 2, when the disk is rotated at a nominal speed of 3600 RPM, the zone bit frequency is 6.3999 megabits/sec (MB/sec) (i.e., 6.399 MHz). If the drive speed is reduced to the next discrete speed of 3339 RPM, represented by line 506, the correct zone bit frequency for zone 2 is 5.9363 MB/sec. As illustrated in the graph, this frequency was used by zone 3 when the spindle speed was 3600 RPM. Similarly, the zone data rate used by zone 2 at 3600 RPM is now used in zone 1. In this matter, the zone data rates shift toward the outer diameter of the disk. At the innermost zone, zone 10 in the illustrated example, a new zone bit frequency is needed by the data channel for each reduction in spindle motor speed. It should now be appreciated that for drives having N zones and M spindle speeds, the number G of data rate frequencies required may be described by the relation $G = N + M - 1$.

As illustrated in FIGS. 4 and 8B, when the rotational speed is reduced using a disk having zones banded using an arithmetic progression, the number of zone bit frequencies which may be reused by other zones is significantly less than a disk having zones allocated using the geometric progression. Thus, the complexity and cost of the data channel can be significantly reduced by using the geometric progression.

In addition to handling varying data rates, other factors must be considered when operating a disk drive at multiple spindle velocities. For example, the flying heights of the heads in a drive will decrease as the drive speed is reduced. In conventional power saving techniques, the heads are moved to a safe zone prior to slowing the disk velocity. In the present technique, however, the heads must retain a fly-height within acceptable read and write operation parameters.

The flying height H, forming an air bearing between the recording head and the disk surface of a disk rotating at a velocity V may empirically be approximated as:

$$H=(V/V_o)^{0.33}H_o$$

Where $V_O$ is the nominal disk speed, and $H_0$ is the nominal flying height at $V_O$. Referring to the drive spindle speeds illustrated in FIG. 5, and assuming that the fly-height is 50 nanometers (nm) at the nominal speed $V_O$, the fly-height at the reduced speeds are 49 nm for 3,339 RPM, 48 nm for 3,097 RPM, and 46 nm for 2,873 RPM. In this example, at a spindle velocity at 2,873 RPM, the power consumed by the spindle motor is reduced to 55% of that at 3,600 RPM. However, the flying height reduction is only 4 nm. Such a slight decrease in flying height is within the tolerances allowed in many disk drives.

Figure 6:
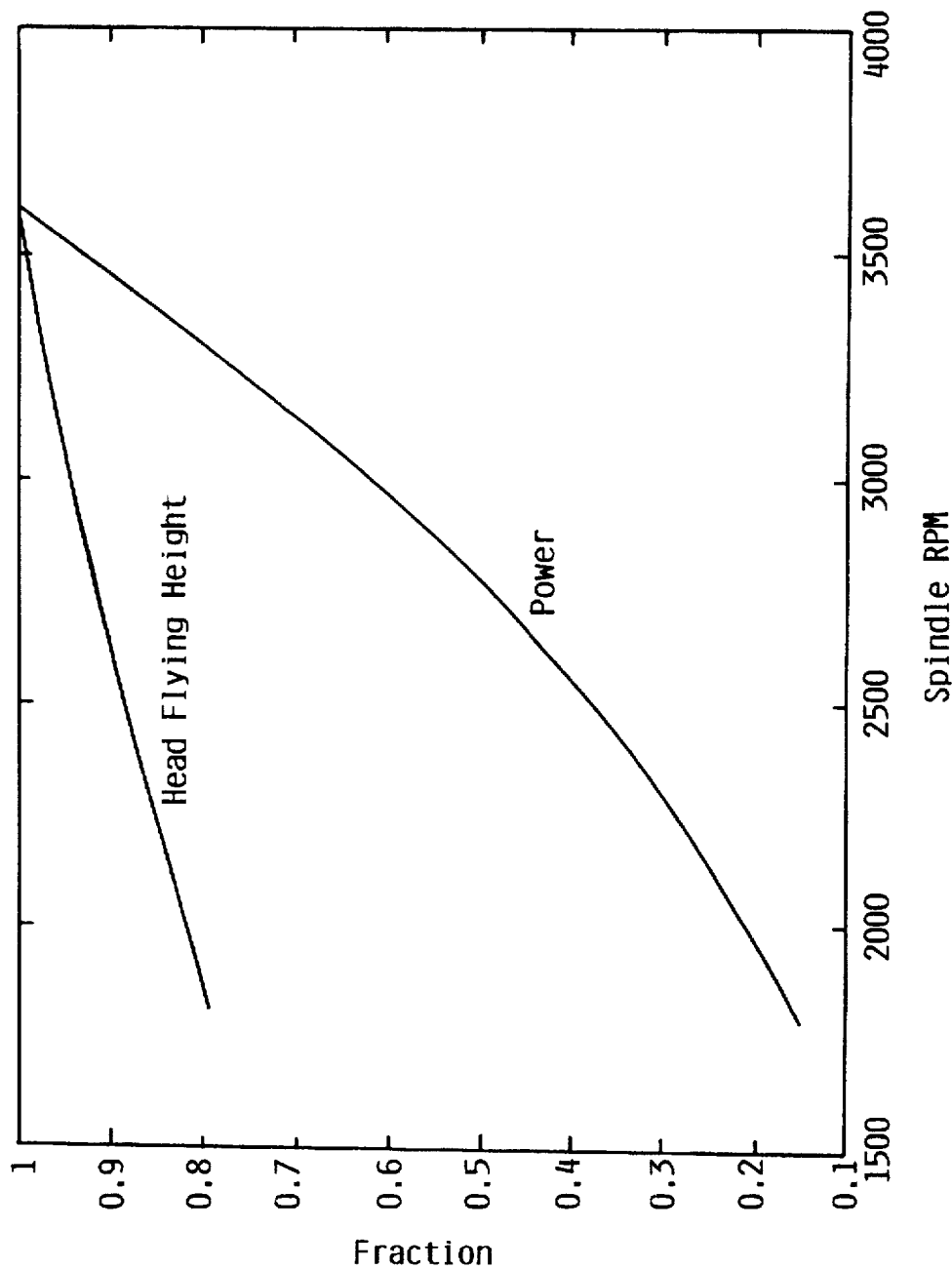
FIG. 6 illustrates a relationship between fractional power and head flying height at different spindle motor velocities for tracks partitioned into zones according to an arithmetic progression.
Figure 7:
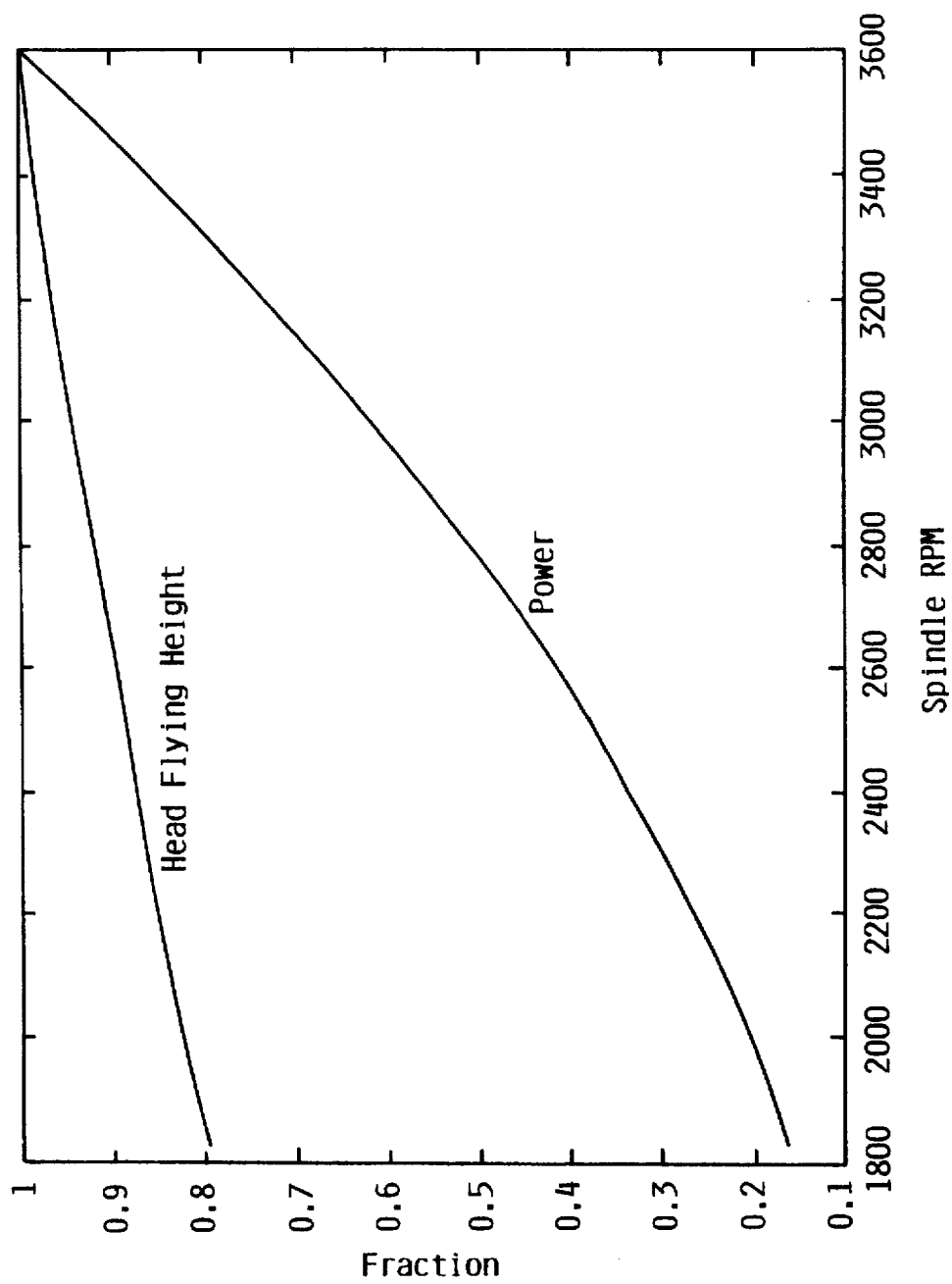
FIG. 7 illustrates a relationship between fractional power and head flying height at different spindle motor velocities for tracks partitioned into zones according to a geometric progression.

The fractional power and head flying heights for the arithmetic and geometric radii progressions are illustrated in FIG. 6 and 7, respectively. FIGS. 8A and 8B are tables depicting the zone radii (for the inner radii for each zone in millimeters) and frequency in Megahertz for the geometric and arithmetic radii progressions, respectively, as a function of varying spindle speed (RPM). The tables also list the fractional flying height (FH) and fractional power (POWER) for the different spindle speeds. In FIG. 8A, representing the geometric progression, the zone frequencies are identical along the diagonals of the table. The diagonal relationship of the frequencies illustrates the abovenoted advantageous characteristics of the geometric progression in tabular form.

Figure 9A:
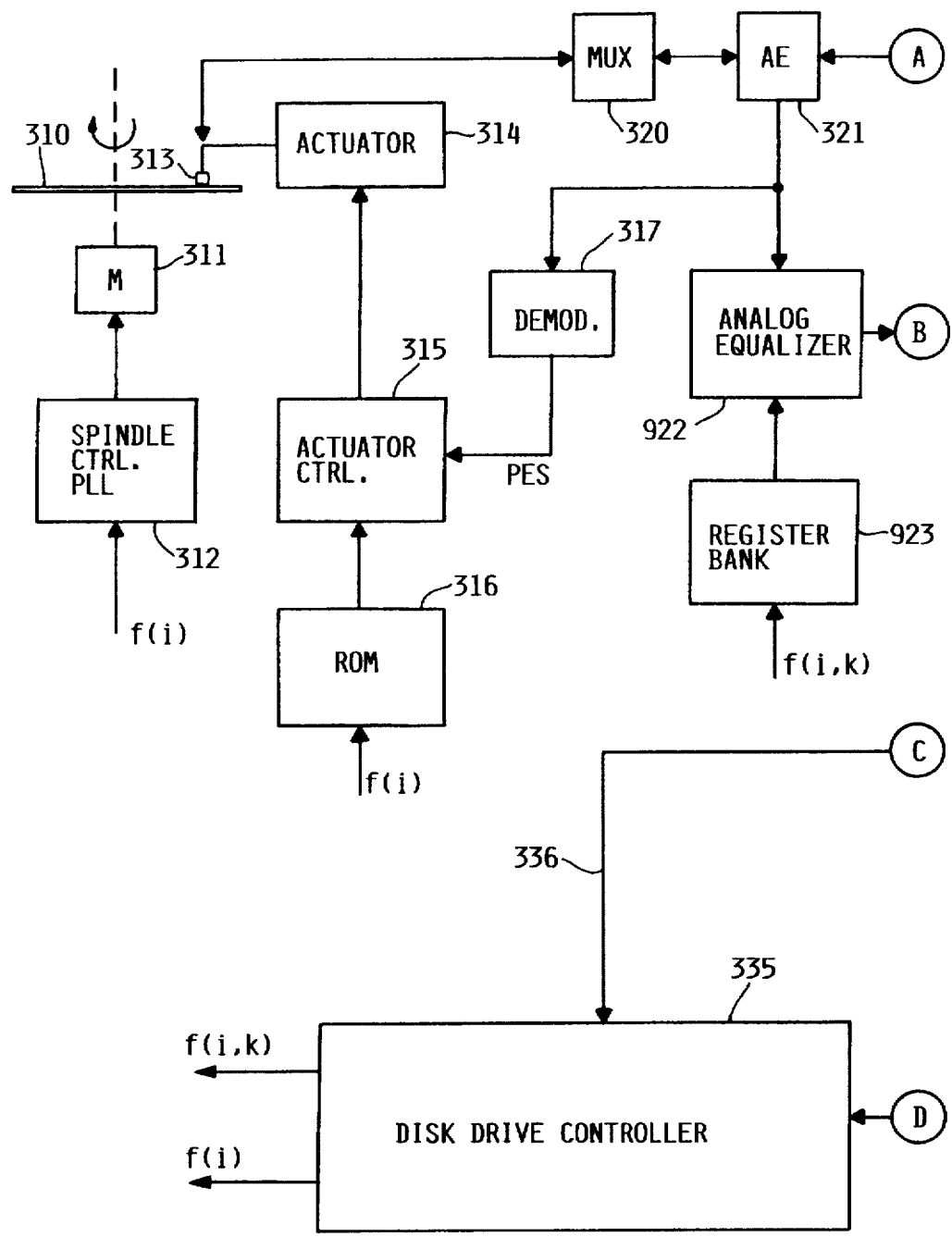
FIG. 9 illustrates another embodiment of the invention.
Figure 9B:
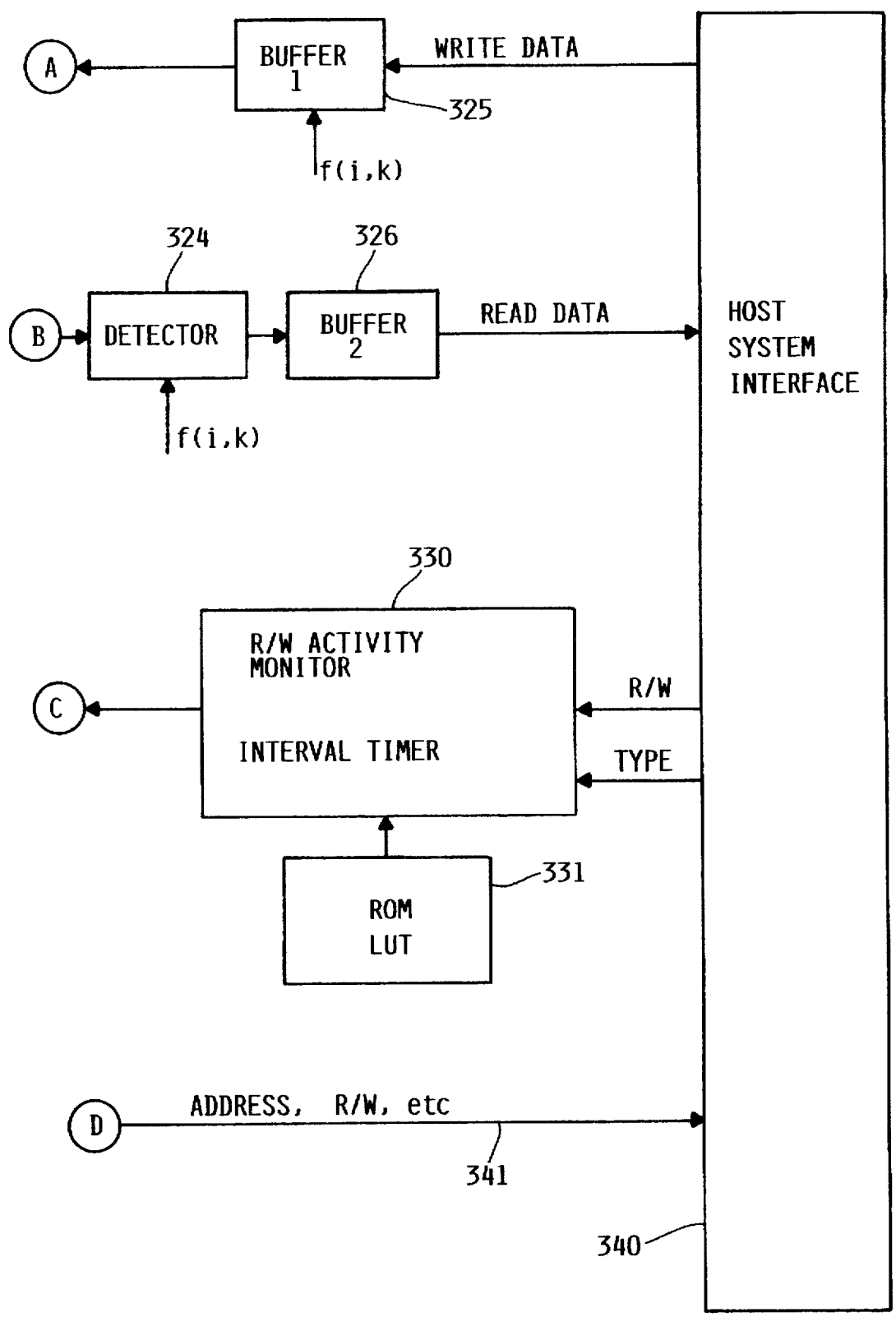

FIG. 9 is similar to FIG. 3 with like parts having like reference numerals. In FIG. 9, a tunable analog equalizer 922 is incorporated into the read channel of the disk drive. The tunable analog equalizer 922 may consist of operational amplifiers with tunable RC networks having capacitors and banks of selectable resistor 923 which are used to change the coefficients of the analog equalizer 922. The resistor bank 923 includes a number of resistors that can be switched in parallel or series to make up different resistor values used by the analog equalizer 922. The different resistor values correspond to the coefficients needed by the analog equalizer 922 as the spindle speed is changed. Thus, different resistor values are used depending upon the spindle velocity and zone information provided to the resistor bank by the control signal f(i,k).

The embodiment depicted in FIG. 9 is useful when very high operating frequencies are used in the disk drive. Current disk drives may operate at recording signal frequencies of over 200 megahertz (MHz). At such rates, analog-to-digital conversion circuitry becomes quite expensive. In order to reduce cost, the read channel may be implemented using more analog components. For example, detection can be simplified by using analog circuitry thereby reducing costs. Further, power dissipation may be reduced using analog components. As the operating speed of the disk drive is further increased the need to use analog devices in the read channel becomes even more important.

One potential drawback to using analog components in a disk drive changing spindle speed to conserve power is that discrete components must be made available for each zone bit frequency used. As can be appreciated, using the above described geometric progression for partitioning zones provides for significant cost savings by reducing the number of different zone bit frequencies the drive must handle thereby reducing the number of discrete analog components needed.

While the invention has been described above in connection with various embodiments, it will be apparent from the above disclosure that the implementation may be used with various other systems and embodiments. Thus, the various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. A memory storage device comprising:
   a disk having N concentric zones, N being an integer greater than 1, provided around a surface of the disk, data being stored in each zone such that a linear density of data at an inner track location of each zone is substantially constant;
   a motor connected to the disk to selectively rotate the disk at a plurality of discrete disk velocities; and
   a transducer provided to perform at least one of a write and a read operation to and from at least two of said zones on the disk at each of the plurality of discrete disk velocities.

2. A device as recited in claim 1, wherein said plurality of discrete disk velocities include a normal operating disk velocity and at least one low power disk velocity, the at least one low power disk velocity being lower than the normal operating disk velocity, the at least one low power disk velocity being used to conserve power.

3. A device as recited in claim 2, wherein:
   the transducer writes data to a selected zone on the disk at a storing frequency corresponding to the selected zone while the disk is rotated at the normal operating disk velocity;
   the data written to the selected zone is read at the storing frequency corresponding to the selected zone when the disk is rotated at the normal operating disk velocity; and
   the data written to the selected zone is read from the disk when the disk is rotated at the low power disk velocity at a storing frequency used to write data to a different zone when the disk is rotated at the normal operating disk velocity.

4. A device as recited in claim 1, wherein the N concentric zones are defined by N inner zone radius $r_i$, for i=1 to N, and wherein an inner zone radius $r_{i-1}$ of a zone $Z_{i-1}$ is determined as asgeometric progression from an inner zone radius $r_i$ of an adjacent zone $z_i$.

5. A device as recited in claim 1, wherein the N concentric zones are defined by N inner zone radius $r_i$, for i=1 to N, determined according to a geometric progression which maintains a substantially constant ratio of radii between adjacent zones.

17

6. A device as recited in claim 4, wherein in the geometric progression determines the inner radius $r_i$ for zone $Z_i$ according to the relationship $$r_i = r_{OD}^{1-ip},$$

where $r_{OD}$ is an outer diameter radius of the disk and $p$ is a substantially fixed geometric progression coefficient.

7. A device as recited in claim 1, wherein each of the N concentric zones is defined by a corresponding inner zone radius $r_i$, for i=1 to N, and wherein the density of data stored on the disk at each of inner zone radius $r_i$ is substantially constant.

8. A method of accessing a memory storage device having a disk for storing data in a plurality of concentric zones, data being stored at an innermost track location for each of the plurality of concentric zones at a substantially constant linear density, the method comprising the steps of:

(a) rotating the disk at a first disk velocity;

(b) performing access operations to the plurality of concentric zones while rotating the disk at the first disk velocity;

(c) rotating the disk at a second disk velocity; and (d) performing access operations to the plurality of concentric zones while rotating the disk at the second disk velocity.

9. A method as recited in claim 8, wherein the rotating step (c) comprises the steps of:

i. detecting a low power mode condition; and ii. initiating a reduction in disk velocity to the second disk velocity in response to the low power mode condition.

10. A method as recited in claim 8, wherein the access operations comprise at least one of data read operations and data write operations.

11. A method as recited in claim 8, wherein the access operations comprise data read operations.

12. A method as recited in claim 11, further comprising the steps of:

(e) resuming the first disk velocity; and (f) writing data to the plurality of concentric zones while rotating the disk at the first disk velocity.

13. A method as recited in claim 11, further comprising the steps of:

(e) initiating a write operation to write data to the disk;

(f) if the disk is rotating at the first velocity, writing the data to the disk at a frequency corresponding to a zone in which the data is written in response to the initiating step (e); and (g) if the disk is rotating at the second velocity, i. writing the data in a temporary memory, ii. changing the velocity of the disk to the first disk velocity, and iii. copying the data from the temporary memory to the disk at the frequency corresponding to the zone in which the data to be written while the disk is rotated at the first disk velocity.

14. A method as recited in claim 8, further comprising the steps of:

performing an access operation to a first zone of the plurality of zones while the disk is rotating at the first disk velocity at a first data bit frequency; and performing an access operation to a second zone of the plurality of zones while the disk is rotating at the second disk velocity at the first data bit frequency.

18

15. A method as recited in claim 14, wherein the first zone is radially adjacent to the second zone.

16. A method as recited in claim 15, further comprising the steps of:

rotating the disk at a third disk velocity; and performing an access operation to a third zone of the plurality of zones while rotating the disk at the third disk velocity at the first data bit frequency.

17. A computer, including a disk storage device having a disk formed with a plurality of concentric zones of banded track locations for storing data for use by the computer, an innermost track location of each of said zones having data stored thereon at a substantially constant linear density, the computer comprising:

rotating means coupled to the storage disk for rotating the storage disk at a desired disk velocity;

control means, for determining a current operational mode of the disk drive and for controlling the rotating means to rotate the disk at a disk velocity corresponding to the current operational mode; and access means for performing access operations to the plurality of concentric zones at zone bit frequencies corresponding to the plurality of concentric zones for the disk velocity corresponding to the current operational mode, wherein in the access operations comprise data read operations and data write operations.

18. A computer, including a disk storage device having a disk formed with a plurality of concentric zones of banded track locations for storing data for use by the computer, an innermost track location of each of said zones having data stored thereon at a substantially constant linear density, the computer comprising:

rotating means coupled to the storage disk for rotating the storage disk at a desired disk velocity;

control means, for determining a current operational mode of the disk drive and for controlling the rotating means to rotate the disk at a disk velocity corresponding to the current operational mode; and access means for performing access operations to the plurality of concentric zones at zone bit frequencies corresponding to the plurality of concentric zones for the disk velocity corresponding to the current operational mode, wherein the computer operates in a plurality of operational modes include a normal operational mode and a low power operational mode and wherein a disk velocity corresponding to the low power operational mode is less than a disk velocity corresponding to the normal operational mode.

19. A computer as recited in claim 18, wherein the control means comprises:

input means for inputting a user selected low power mode; and means for controlling the rotating means to rotate the disk at the disk velocity corresponding to the low power operational mode in response to the user selected the low power mode.

20. A computer as recited in claim 18, wherein the control means comprises:

monitoring means for monitoring access operations to the disk storage device; and initiation means for automatically initiating the low power operational mode when a number of access operations to the disk storage device is below a predefined threshold.

21. A computer as recited in claim 18, further comprising:

a temporary holding memory; and a write control means for controlling write operations to said disk storage device, wherein, when a write operation of data to the disk storage device is initiated while the computer is operating in the low power operational mode, the write control means writes the data in the temporary holding memory until the velocity of the disk is increased to a disk velocity corresponding the normal operational mode, and copies the data from the temporary holding memory to the disk while the disk is rotating at the disk velocity corresponding to the normal operational mode.

* * * * *

UNITED STATES PATENT AND TRADEMARK OFFICE
CERTIFICATE OF CORRECTION

PATENT NO. : 5,787,292
DATED : July 28, 1998
INVENTOR(S) : H H Ottesen, et al

It is certified that error appears in the above-identified patent and that said Letters Patent is hereby corrected as shown below:

On title page, item
[75] Inventors: "Hijalmar" should be --Hjalmar--.

Col. 16, Line 61, "asgeometric" should be --a geometric--.

Signed and Sealed this

Sixth Day of October, 1998

*Attest:*

BRUCE LEHMAN

*Attesting Officer*  *Commissioner of Patents and Trademarks*